(12) United States Patent
Prezecki, II

(10) Patent No.: US 10,493,887 B2
(45) Date of Patent: Dec. 3, 2019

(54) ARMREST INCORPORATING VARIABLE VOLUME STORAGE COMPARTMENT

(71) Applicant: FORD GLOBAL TECHNOLOGIES, LLC, Dearborn, MI (US)

(72) Inventor: Leonard Gus Prezecki, II, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/798,520

(22) Filed: Oct. 31, 2017

(65) Prior Publication Data

US 2019/0126791 A1 May 2, 2019

(51) Int. Cl.
    *B60N 2/75*      (2018.01)

(52) U.S. Cl.
    CPC ............. *B60N 2/793* (2018.02); *B60N 2/757* (2018.02)

(58) Field of Classification Search
    CPC .......... A47C 7/543; A47C 7/68; B60N 2/4686
    USPC ................. 297/115, 188.14, 188.15, 188.19
    See application file for complete search history.

(56) References Cited

U.S. PATENT DOCUMENTS

| | | | |
|---|---|---|---|
| 5,749,629 A | 5/1998 | Heath et al. | |
| 6,145,474 A * | 11/2000 | Lemkin | A01K 5/01 119/61.5 |
| 6,761,278 B2 * | 7/2004 | Hyp | B60R 7/04 220/254.2 |
| 7,757,888 B2 * | 7/2010 | Ogura | B60N 3/106 220/345.1 |
| 2009/0120930 A1 * | 5/2009 | Sexton | B65F 1/02 220/8 |
| 2013/0082492 A1 * | 4/2013 | Andersson | B60N 3/102 297/188.17 |
| 2013/0277365 A1 * | 10/2013 | Kaufman | B65F 1/1426 220/8 |

FOREIGN PATENT DOCUMENTS

| | | |
|---|---|---|
| CN | 202457399 U | 10/2012 |
| CN | 202819272 U | 3/2013 |

OTHER PUBLICATIONS

English Machine Translation of CN202457399U.
English Machine Translation of CN202819272U.

* cited by examiner

*Primary Examiner* — Joanne Silbermann
(74) *Attorney, Agent, or Firm* — Vichit Chea; King & Schickli, PLLC

(57) ABSTRACT

An armrest includes a variable volume storage compartment defined within a first end wall, a second end wall and a telescoping sidewall. A related method of storing items within an armrest is also disclosed.

8 Claims, 6 Drawing Sheets

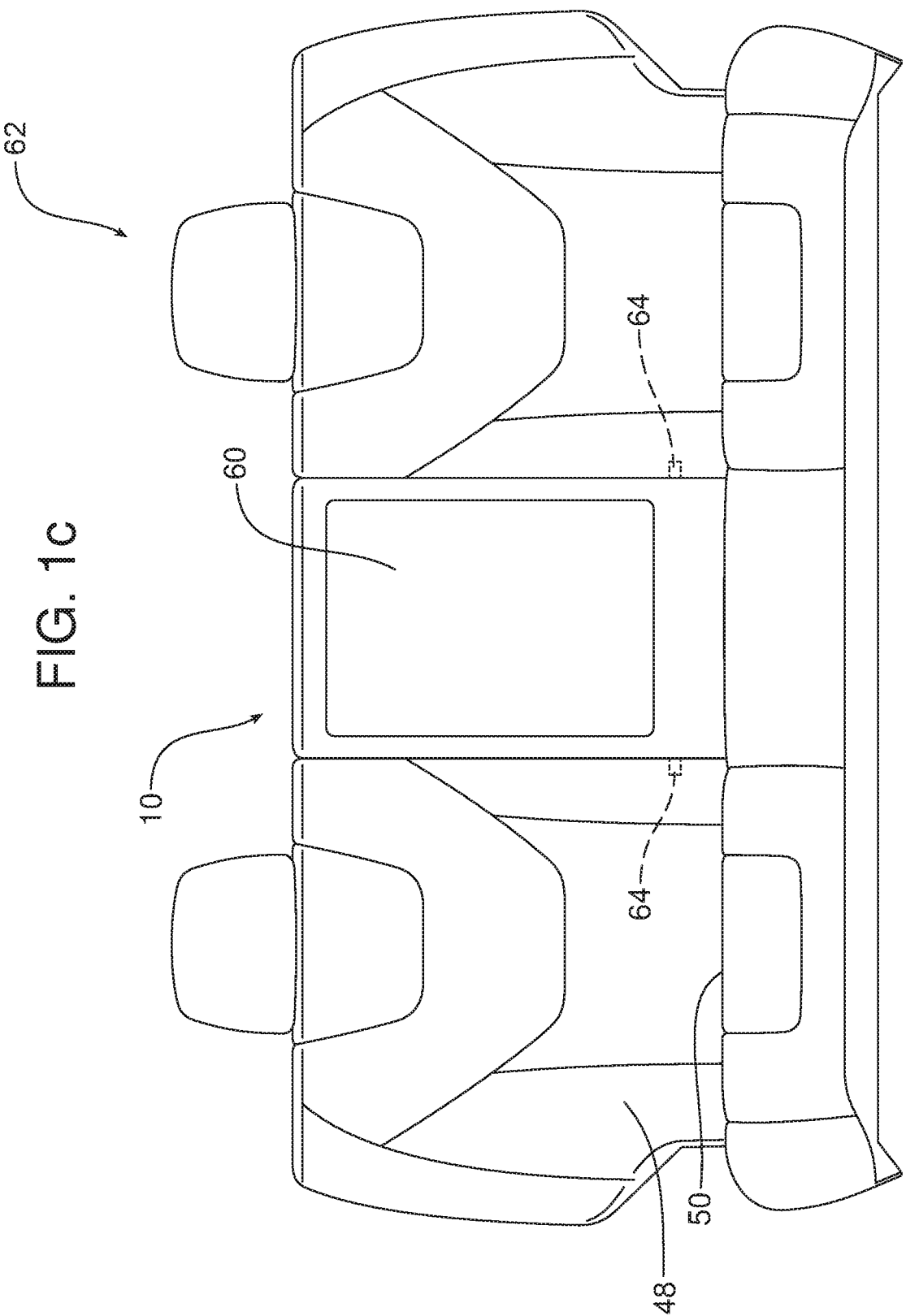

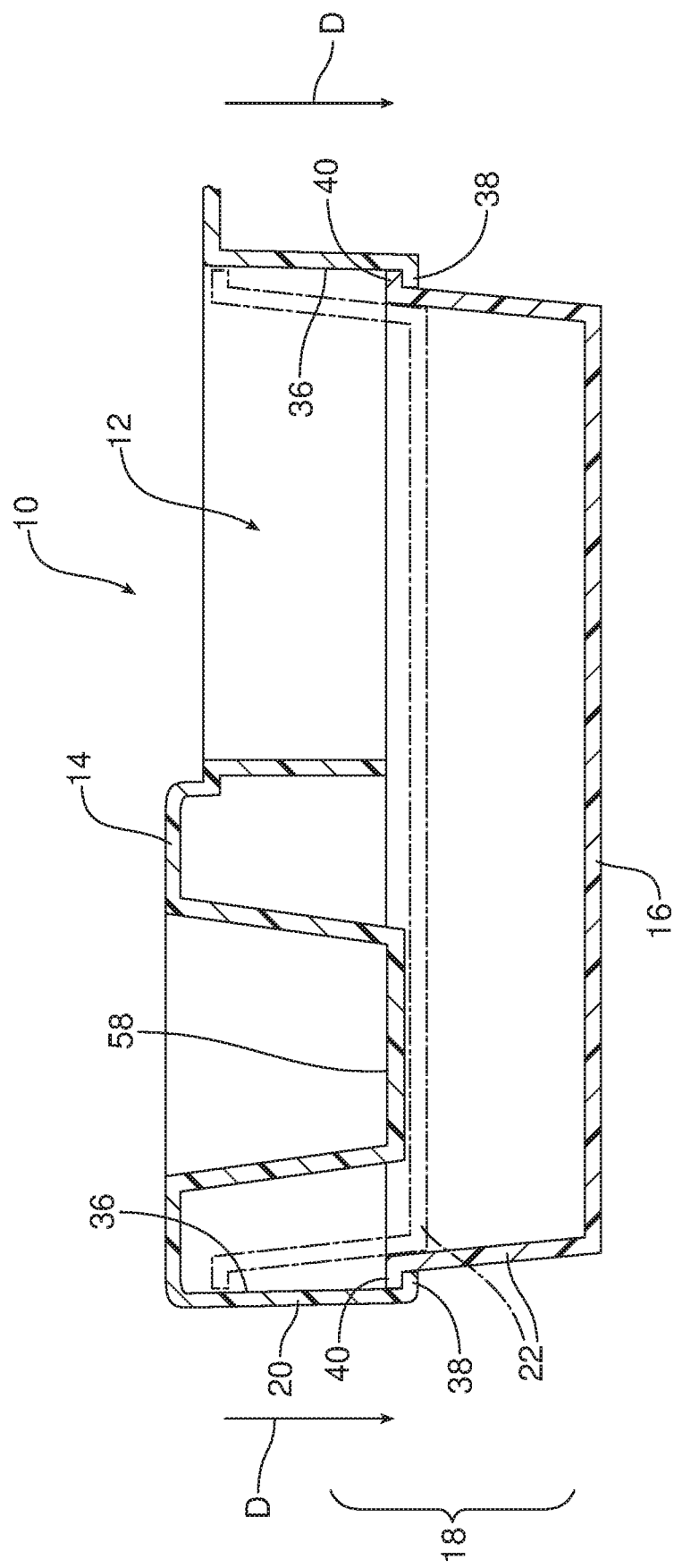

ARMREST INCORPORATING VARIABLE VOLUME STORAGE COMPARTMENT

TECHNICAL FIELD

This document relates generally to the motor vehicle equipment field and, more particularly, to a new and improved armrest including a variable volume storage compartment that may be expanded as desired in order to provide additional storage space.

BACKGROUND

It is known in the art to incorporate an armrest into a seat assembly of a motor vehicle. It is further known in the art to provide such an armrest with a storage compartment accessed through a cooperating lid. As a result of packaging limitations, such an internal storage compartment is typically very shallow, thereby providing only a limited volume for storage purposes.

This document relates to a new and improved armrest incorporating a variable volume storage compartment. When deployed, the variable volume storage compartment may be expanded to provide greater volume and depth for storing various items for the benefit and advantage of the user.

SUMMARY

In accordance with the purposes and benefits described herein, a new and improved armrest is provided. That armrest comprises a variable volume storage compartment defined within a first end wall, a second end wall and a telescoping sidewall.

The telescoping sidewall may include a first section and a second section. The second section may be displaceable with respect to the first section between a first position nesting within the first section and a second position projecting from the first section. Significantly, the variable volume storage compartment has a first volume $V_1$ when the second section is in the first position and a second volume $V_2$ when the second section is in the second position where $V_1 < V_2$.

The armrest may further include a first latch feature for releasably securing the second section in the first position. Further, the armrest may include a guideway and a stop carried on the first section and a cooperating guideway slide carried on the second section. This ensures smooth sliding action when the second section is displaced between the two different positions.

The first end wall of the armrest may include a lid. That lid may be connected to the first section by a hinge. The second end wall may be connected to the second section opposite the lid.

A second latch feature releasably secures the lid in a closed position covering an access opening in the first section. In addition, the armrest may include a cup holder carried on the first section adjacent the lid. Further, the armrest may include a first cushion carried on the lid. In addition, the armrest may include a second cushion carried on the second end wall.

In accordance with an additional aspect, a seat assembly is provided. That seat assembly comprises a seat back, a seat bottom and the armrest pivotally mounted to the seat back on a pivot feature. That armrest includes the variable volume storage compartment described herein.

In accordance with still another aspect, a method is provided of storing items within an armrest. That method comprises the steps of deploying the armrest into a use position and expanding a variable volume storage compartment within the armrest to increase a storage capacity of the variable volume storage compartment.

The step of expanding the variable volume storage compartment may include releasing a first latch feature and displacing a telescoping sidewall of the armrest. Further, displacing the telescoping sidewall may include displacing a second section of the telescoping sidewall from a first position nested within a first section of the telescoping sidewall to a second position projecting from the first section.

The method may further include the step of opening a lid of the armrest. In addition, the method may include the step of placing items to be stored into the variable volume storage compartment and this may be followed by the step of closing the lid.

After use, the method may include the step of displacing the second section to the first position. Further, the method may include latching the second section in the first position nested within the first section. Further, the method may include returning the armrest to a stowed position within a seat back following use.

In the following description, there are shown and described several preferred embodiments of armrest as well as the method of storing items within an armrest. As it should be realized, the armrest and related method are capable of other, different embodiments and their several details are capable of modification in various, obvious aspects all without departing from the armrest and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the armrest and related method of storing items within the armrest and together with the description serve to explain certain principles thereof.

FIG. 1c is a view similar to FIGS. 1a and 1b but illustrating the armrest in a stowed position in the seat back and with the telescoping sidewall in the first or retracted position.

FIG. 3 is a cross sectional view illustrating the construction of the telescoping sidewall.

Figure 1A:
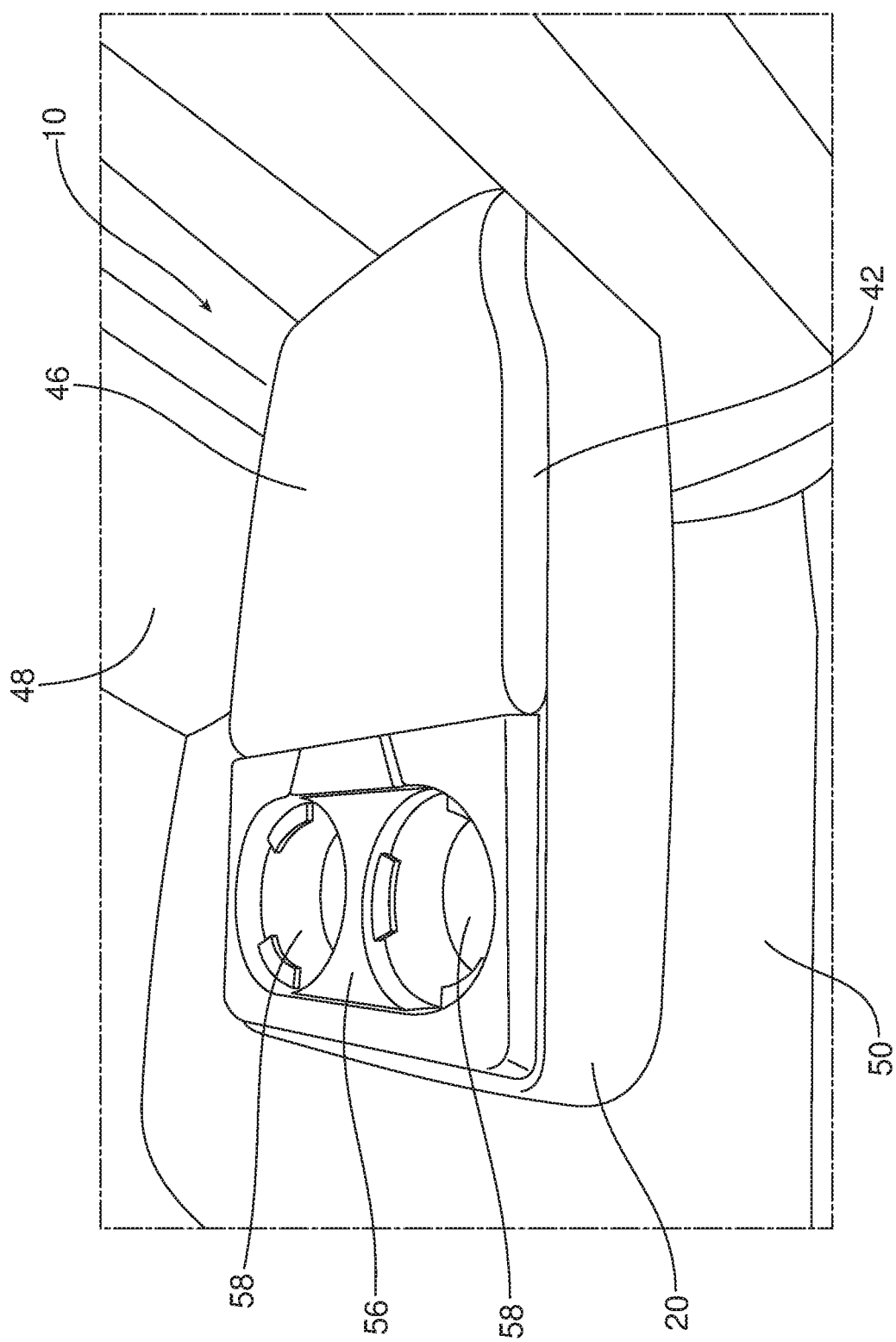
FIG. 1a is a detailed perspective view illustrating a seat assembly incorporating a seat back, a seat bottom and an armrest with a variable volume storage compartment having a telescoping sidewall concealed in a first or nesting position.
Figure 1B:
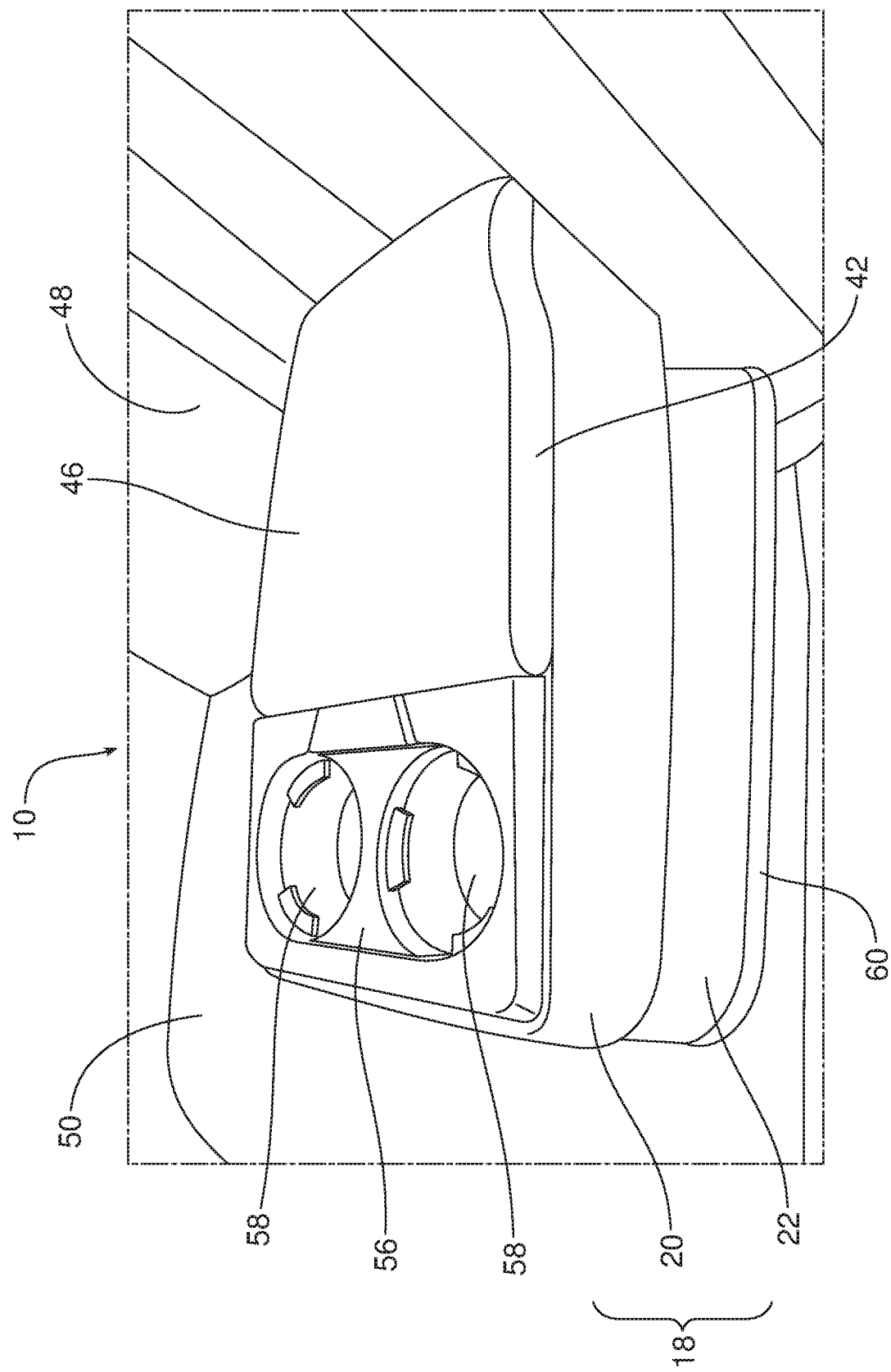
FIG. 1b is a view similar to FIG. 1a but showing the telescoping sidewall in a second or projecting position that provides the variable volume storage compartment with increased volume and depth for added storage.

Reference will now be made in detail to the present preferred embodiments of the armrest, examples of which are illustrated in the accompanying drawing figures.

DETAILED DESCRIPTION

Reference is now made to FIGS. 1a1c, 2, 3, 4a and 4b illustrating the new and improved armrest 10 have a variable volume storage bin or compartment 12 defined within a first end wall 14, a second end wall 16 and a telescoping sidewall 18. As best illustrated in FIG. 3, the telescoping sidewall 18 includes a first section 20 and a second section 22.

As will become apparent from the following description, the second section 22 is displaceable with respect to the first section 20 between a first position nesting within the first section 20 (illustrated in phantom line in FIG. 3) and a second position projecting from the first section (illustrated in full line in FIG. 3). As should be appreciated, the variable volume storage compartment 12 has a first volume $V_1$ when the second section 22 is in the first position and a second volume $V_2$ when the second section is in the second position where $V_1 < V_2$.

Figure 4A:
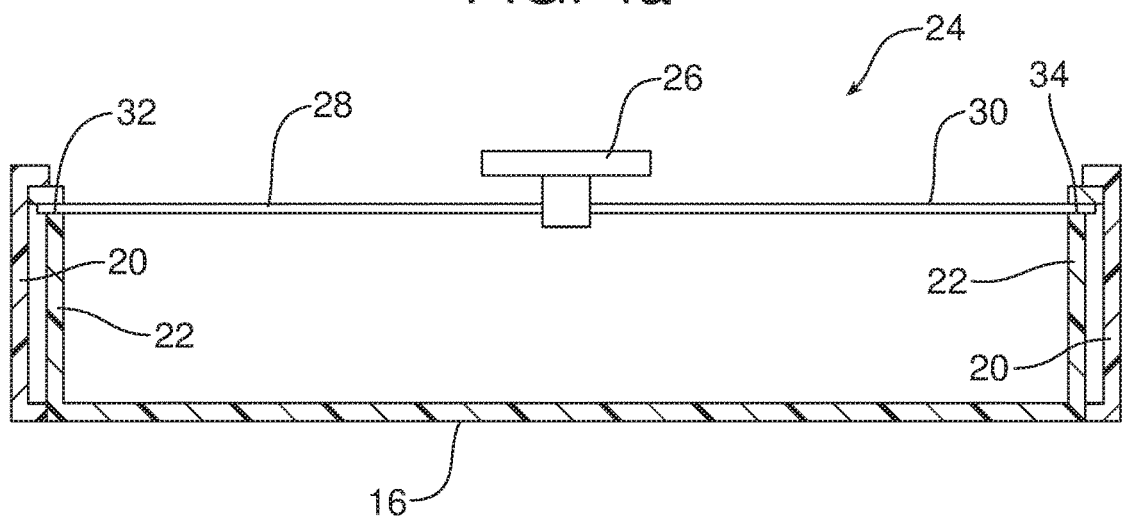
FIG. 4a is a schematic illustration of the first latch feature that releasably secures the telescoping sidewall in the first or retracted position.

As illustrated in FIG. 4a, a first latch feature 24 releasably secures the second section 22 in the first position nested within the first section 20. The first latch feature 24 is carried on the first end wall 14 of the first section 20. In the illustrated embodiment, the first latch feature 24 includes a latch actuator 26, a first latch pall 28 and a second latch pall 30 opposed to the first latch pall 28.

When the second section 22 is latched in the first position nesting within the first section 20, the first latch pall 28 engages in a first latch pall receiver 32 in the second section 22 while the second latch pall 30 engages in a second latch pall receiver 34 also in the second section.

Figure 4B:
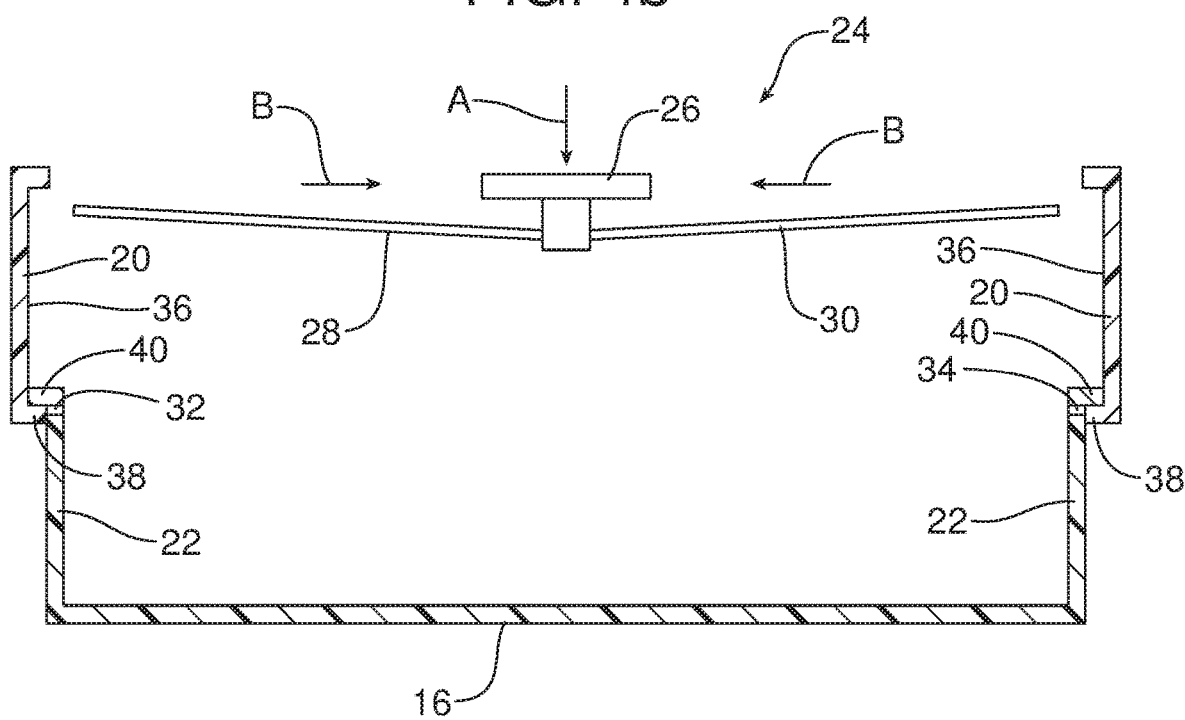
FIG. 4b is a view similar to FIG. 4a but showing the first latch feature in the unlatched position freeing the telescoping sidewall and allowing expansion thereof.

When one wishes to release the second section 22 of the telescoping sidewall 18 to expand the volume of the variable volume storage compartment 12, one depresses the latch actuator 26 (note action arrow A in FIG. 4b) thereby folding the first and second latch palls 28, 30 and withdrawing those latch palls from the respective first and second latch pall receivers 32, 34 (note action arrows B in phantom line showing in FIG. 4b). This serves to release second section 22 of the telescoping sidewall 18 which may then be displaced to the second position expanding the variable volume storage compartment 12.

As best illustrated in FIG. 3, the first section 20 includes a guideway 36 and a stop 38. The second section 22 includes a guideway slide 40. As the variable volume storage compartment 12 is expanded by displacement of the second section 22 within the first section 20 of the telescoping sidewall 18, the guideway slide 40 on the second section slides in the direction of action arrow D through the guideway 36 until the guideway slide engages the stop 38 at which point the telescoping sidewall is in the second or expanded volume position. As should be appreciated, engagement of the guideway slide 40 with the stop 38 ensures that the second section 22 does not pull completely out of the first section 20 thereby ensuring the integrity of the variable volume storage compartment 12. As clearly illustrated in FIG. 3, the displacement of the second section 22 from the first position to the second position substantially increases the volume of the variable volume storage compartment 12 providing additional capacity for storing items for the benefit and advantage of the user.

The armrest 10 may also include some additional convenience features. For example, the first end wall 14 of the illustrated embodiment includes a lid 42 that is connected to the first section 20 of the telescoping sidewall 18 by a hinge 44. A first cushion 46 may be carried on one side of the lid 42. When the lid 42 is closed as illustrated in FIG. 1a, and the armrest is deployed from the seat back 48 over the seat bottom 50 the first cushion 46 is facing upward to provide a comfortable resting place for the forearm or elbow of a user.

Figure 2:
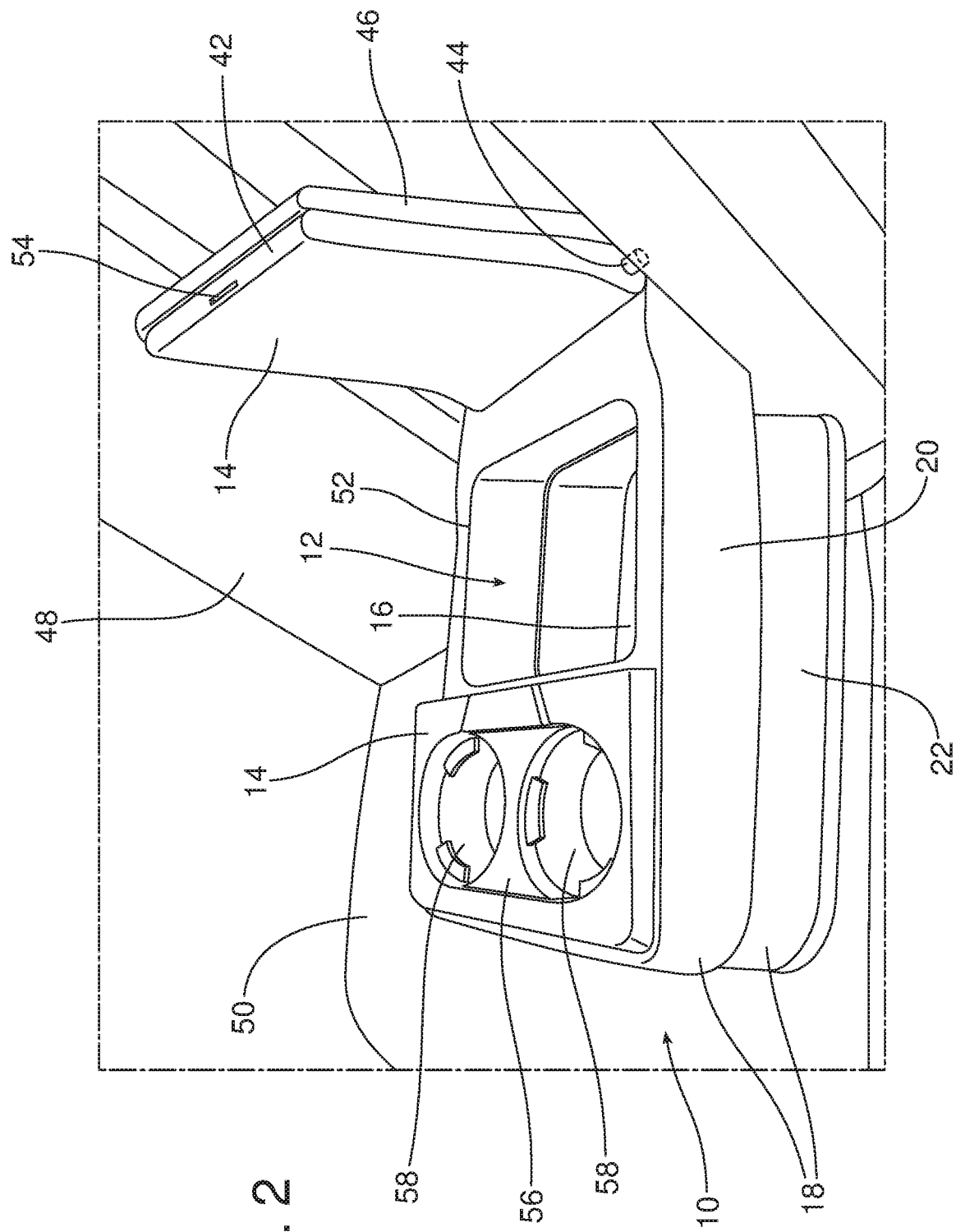
FIG. 2 is a perspective view illustrating the armrest with (a) the telescoping sidewall in the second or expanded position thereby providing the storage compartment with a larger volume and greater capacity for storing items and (b) the lid open to provide access to that storage compartment.

When the lid 42 is open as illustrated in FIG. 2, the access opening 52 is uncovered to allow convenient access through the top of the variable volume storage compartment 12 to items contained therein.

A second latch feature 54 may be provided for releasably securing the lid 42 in the closed position covering the access opening 52 in the first section 20. Of course, as should be appreciated, that second latch feature 54 may be released to allow one to open the lid 42 and access the contents in the variable volume storage compartment 12.

As further illustrated, a cup holder 56 may be carried on the first section 20 adjacent the lid 42. In the illustrated embodiment, the cup holder 56 incorporates two cup wells 58 for holding two cups or beverage containers.

As should be appreciated from reviewing the drawing figures, the second end wall 16 is connected to the second section 22 of the telescoping sidewall 18 opposite the lid 42. As best illustrated in FIG. 1c, the second end wall 16 may be covered by a second cushion 60. That second cushion 60 is exposed when the armrest is in the stowed position nested seat back 48.

As should be apparent from the foregoing, a seat assembly 62 has been described. That seat assembly 62 comprises the seat back 48, the seat bottom 50 and the armrest 10 pivotally mounted to the seat back on a pivot feature 64.

A method of storing items within an armrest 10 is also provided. That method includes the steps of deploying the armrest 10 from a stowed position nested within the seat back 48 as illustrated in FIG. 1c into a use position as illustrated in FIG. 1a. Further, the method includes the step of expanding the variable volume storage compartment 12 within the armrest 10 to increase the storage capacity of the variable volume storage compartment.

More specifically, the expanding of the variable volume storage compartment 12 includes releasing the first latch feature 24 and displacing the telescoping sidewall 18 of the armrest 10.

The displacing of the telescoping sidewall 18 includes displacing the second section 22 of the telescoping sidewall from a first position nested within the first section 20, to a second position projecting from the first section.

In addition, the method may further include the step of opening the lid 42 of the armrest 10 (see FIG. 2). This may be followed by the step of placing items to be stored into the variable volume storage compartment 12 through the access opening 52. The method may also then include the step of closing the lid 42 thereby concealing the items within the variable volume storage compartment 12.

After the items are removed from the variable volume storage compartment 12, the method may include displacing the second section 22 of the telescoping sidewall 18 from the second position to the first position and then latching the second section in the first position nested within the first section by operation of the first latch feature 24. If desired, the method may then include the step of returning the armrest 10 to the stowed position within the seat back 48 as illustrated in FIG. 1c.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. An armrest, comprising:
a variable volume storage compartment defined within a first end wall, a second end wall and a telescoping sidewall wherein (a) said telescoping sidewall includes a first section and a second section, (b) said second section is displaceable with respect to said first section between a first position nesting within said first section and a second position projecting from said first section, (c) said variable volume storage compartment has a first volume $V_1$ when said second section is in said first position and a second volume $V_2$ when said second section is in said second position where $V_1 < V_2$ and (d) said first end wall and said second end wall are spaced farther apart in said second position than said first position wherein said first end wall includes a lid connected to said first section by a hinge, said second end wall is connected to said second section opposite said lid and said second section extends completely around the second end wall.

2. The armrest of claim 1, further including a first latch feature releasably securing said second section in said first position.

3. The armrest of claim 2, further including a guideway and a stop carried on said first section and a guideway slide carried on said second section.

4. The armrest of claim 3, further including a second latch feature releasably securing said lid in a closed position covering an access opening in said first section.

5. The armrest of claim 4, further including a cup holder carried on said first section adjacent said lid.

6. The armrest of claim 5, further including a first cushion carried on said lid.

7. The armrest of claim 6, further including a second cushion carried on said second end wall.

8. A seat assembly, comprising:
a seat back;
a seat bottom; and
said armrest of claim 1 pivotally mounted to said seat back on a pivot feature.

* * * * *